(12) United States Patent
Chan

(10) Patent No.: US 6,238,022 B1
(45) Date of Patent: May 29, 2001

(54) DISC STORAGE CONTAINER

(75) Inventor: Sik-Leung Chan, Tsuen Wan (HK)

(73) Assignee: C. C. & L Company Limited, Hong Kong (HK)

( * ) Notice: Subject to any disclaimer, the term of this patent is extended or adjusted under 35 U.S.C. 154(b) by 0 days.

(21) Appl. No.: 09/625,706

(22) Filed: Jul. 25, 2000

(51) Int. Cl.[7] .................................................. A47B 81/06
(52) U.S. Cl. ........................................ 312/9.11; 312/9.15
(58) Field of Search .................................. 312/9.9, 9.11, 312/9.12, 9.13, 9.14, 9.15, 9.16, 9.19, 9.23, 9.53, 9.58; 206/307, 308.1, 309; 211/40

(56) References Cited

U.S. PATENT DOCUMENTS

| | | | |
|---|---|---|---|
| 1,360,679 | * 11/1920 | Pomeroy et al. | 312/9.15 |
| 1,878,659 | * 9/1932 | Bader | 312/9.13 |
| 5,338,108 | * 8/1994 | Hunt et al. | 312/9.14 X |
| 6,048,042 | * 4/2000 | Chan | 312/9.11 |

* cited by examiner

Primary Examiner—James O. Hansen
(74) Attorney, Agent, or Firm—Alix, Yale & Ristas, LLP

(57) ABSTRACT

A disc storage container comprising a base (10) and a lid (11). A disc selector (15) has a probe (27) that moves with and when the lid opens to urge against a selected disc lift (23) and so that it partially lifts one of the discs up from a stack of discs stored in the container. This enables easily selection of a chosen disc and manual removal from the container of the chosen disc.

7 Claims, 4 Drawing Sheets

DISC STORAGE CONTAINER

BACKGROUND OF THE INVENTION

1. Field of the Invention

The invention relates to a disc storage container.

2. Description of Prior Art

The invention relates particularly to a container for storing a number of discs, such as compact discs, CDV discs and the like, in a side by side array or stack. A common characteristic of such discs is that they are relatively thin, and when stacked normally for convenience closely together, it is difficult to select and withdraw a chosen disc from the stack. That is to say, a selected disc cannot be readily lifted away from the other discs in the stack.

SUMMARY OF THE INVENTION

It is an object of the invention to overcome this problem.

According to the invention there is provided a disc storage container comprising a base for supporting a plurality of partially exposed discs in a side by side stack, a separator that fits between the discs below exposed regions of the disc to slidably hold the discs parallel and apart from one another, a lid hinged to the base about an axis at one upper edge of the base and arranged to close over the exposed regions of the discs for storage and transportation of the discs, an array of rotatably mounted of separate disc lifters, one for each disc arranged to partially lift a respective disc out of the base, and a manually operable lifter selector externally mounted to the lid having a probe inside the lid to engage a selected lifter to urge against a selected lifter for lifting up one of the discs as the lid is opened.

The array of disc lifters is preferably mounted on the said axis.

The lifter selector may be rotatably mounted on the lid and markings are provided to correspond to each disc position in the stack to facilitate selection of each corresponding to rotational positions of the selector.

The disc storage container may include a mechanical selector stop for each marking.

The container may be generally circular in cross section to surround and enclose the stack of discs, having a horizontal flat bottom and a plane of separation between the base and the lid arranged at about 45° to the horizontal and extending generally across a diameter of the circular cross section.

A manually operable latch may be mounted adjacent a lower edge of the base to engage a remote end of the lid to hold the lid closed.

A coil spring may be mounted about the said axis arranged to bias the lid open.

BRIEF DESCRIPTION OF THE DRAWINGS

A disc storage container according to the invention will now be described by way of example with reference to the accompanying drawings in which.

DESCRIPTION OF THE PREFERRED EMBODIMENT

Figure 1:
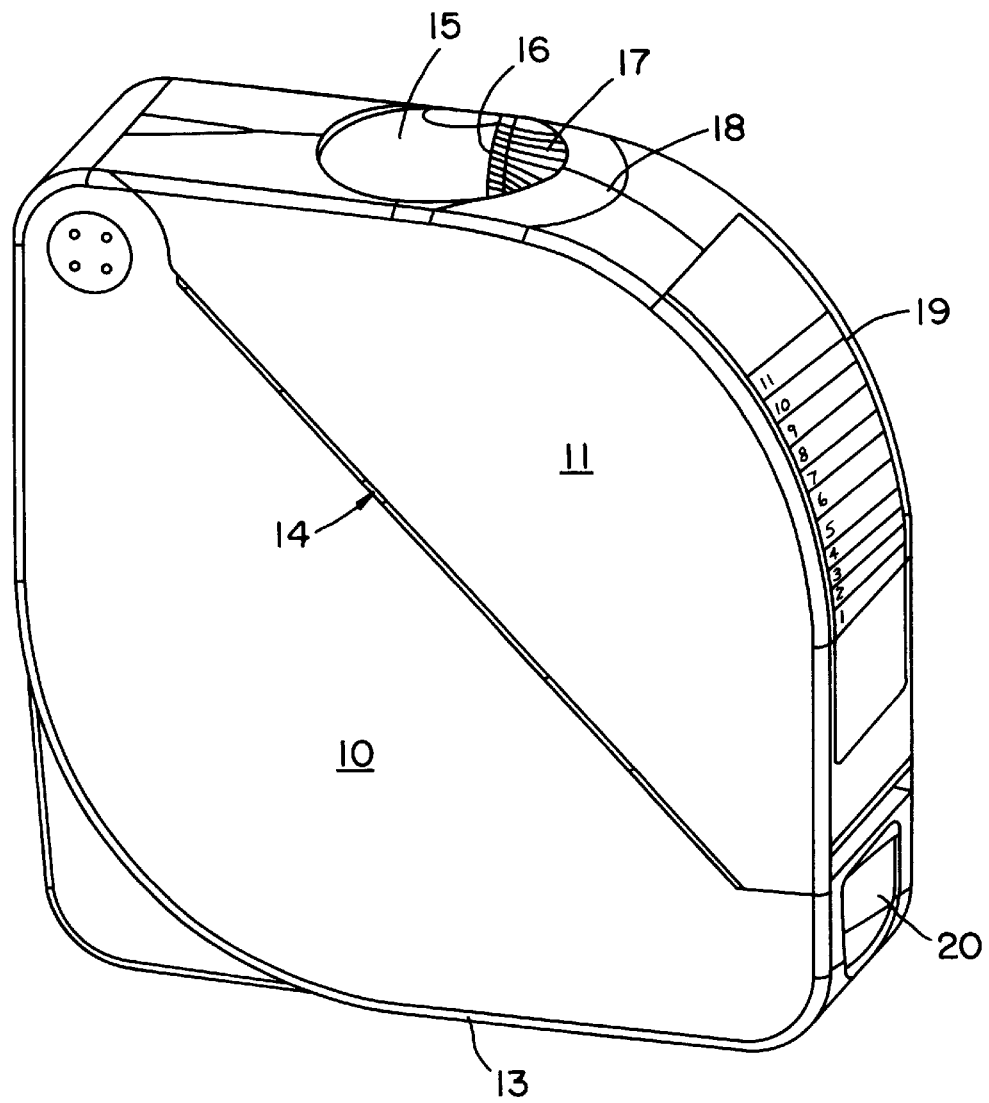
FIG. 1 is an isometric left-hand side view of the container.
Figure 2:
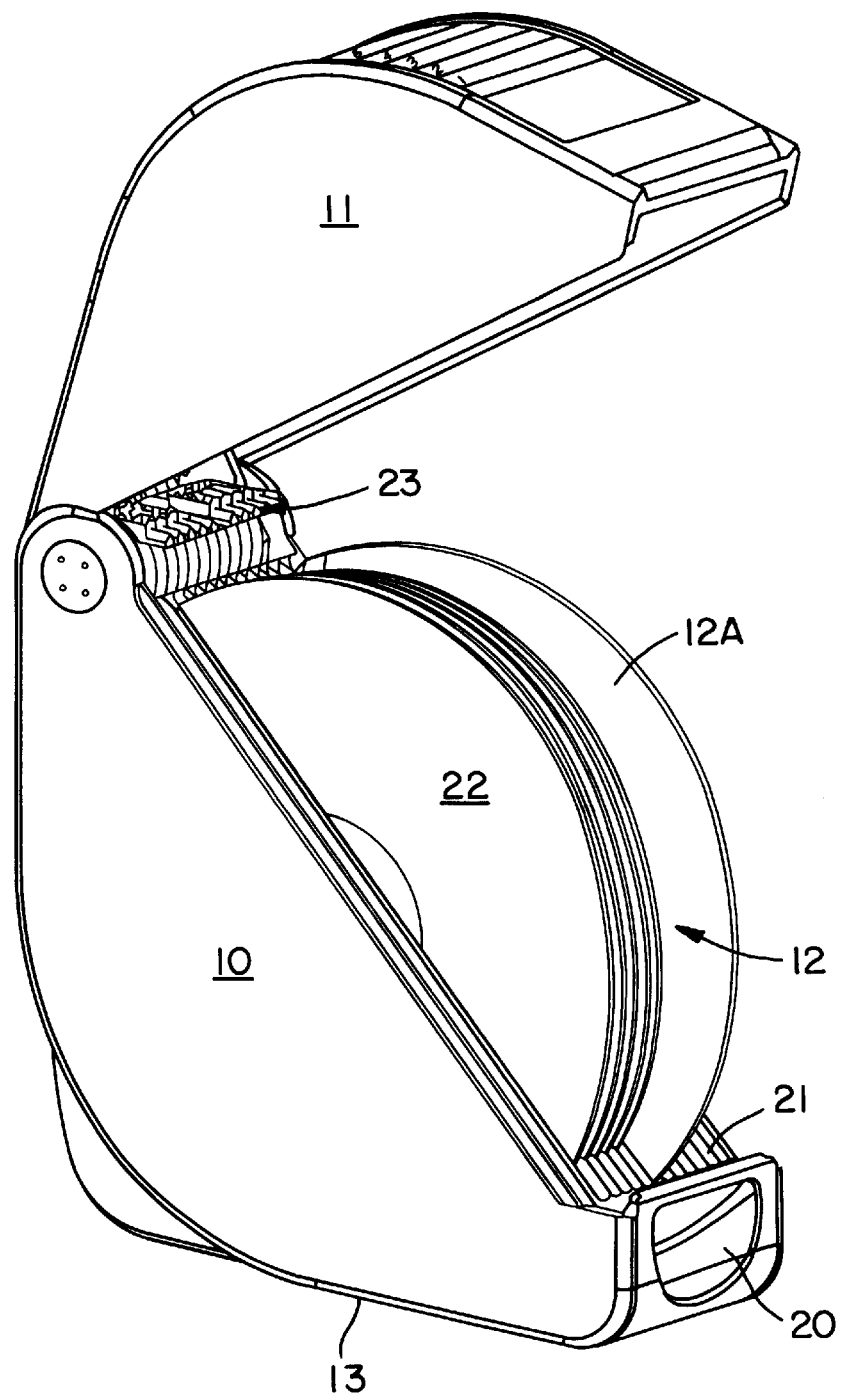
FIG. 2 is an isometric right-hand side view of the container with an open lid.

Referring to the drawings, in FIGS. 1 and 2 the container has a base 10 and a lid 11 hingably connected to the base about an axis adjacent one upper edge of the base 10. The container is generally circular in cross-section to surround and enclose a stack 12 of discs. The base has a horizontal flat bottom 13. A plane 14 of separation between base and the lid that lies at about 45° to the horizontal and extends across a diameter of the circular cross section.

A rotatable lifter selector 15 is mounted externally to the lid and has markings 16 including lead lines 17 and an arrow 18 for enabling selection of individual discs housed in the container, as explained below. A file index panel 19 is provided for convenience of identifying discs that are stored in the container. A manually operable latch 20 is arranged to engage a remote end of the lid to hold the lid closed.

An integrally formed disc separator 21 has elongate limbs that fit between adjacent discs to slidingly hold and support the discs parallel to one another. The limbs pass along the discs below regions 22 of the disc that are normally exposed out of the base 10 as shown in FIG. 2. An array of separate disc lifters 23 are mounted on axles 24 that also connect the lid 11 to the base 10. Integrally formed guides 25 inside the lid serve to keep each of the lifters relatively in place on the axles. A coil spring 26 is mounted on the axles 24 for biassing the lid open.

Extending from an underside of the selector 15 is a probe 27 (see FIG. 3) that can selectively engage a chosen one of the lifters 23. The relative position of the probe is retained by a series of stops 28, in the form of a castellated surface, that are engaged by a nipple 29 that moves in use with the probe 27. Thus, once a lifter has been selected the nipple 29 will remain trapped, or "stopped", between a respective castellation. It will be noted that the nipple 29 can be is forced to ride over the castellations, when required, whenever the selector 15 is rotated for selecting some other lifter.

Figure 3:
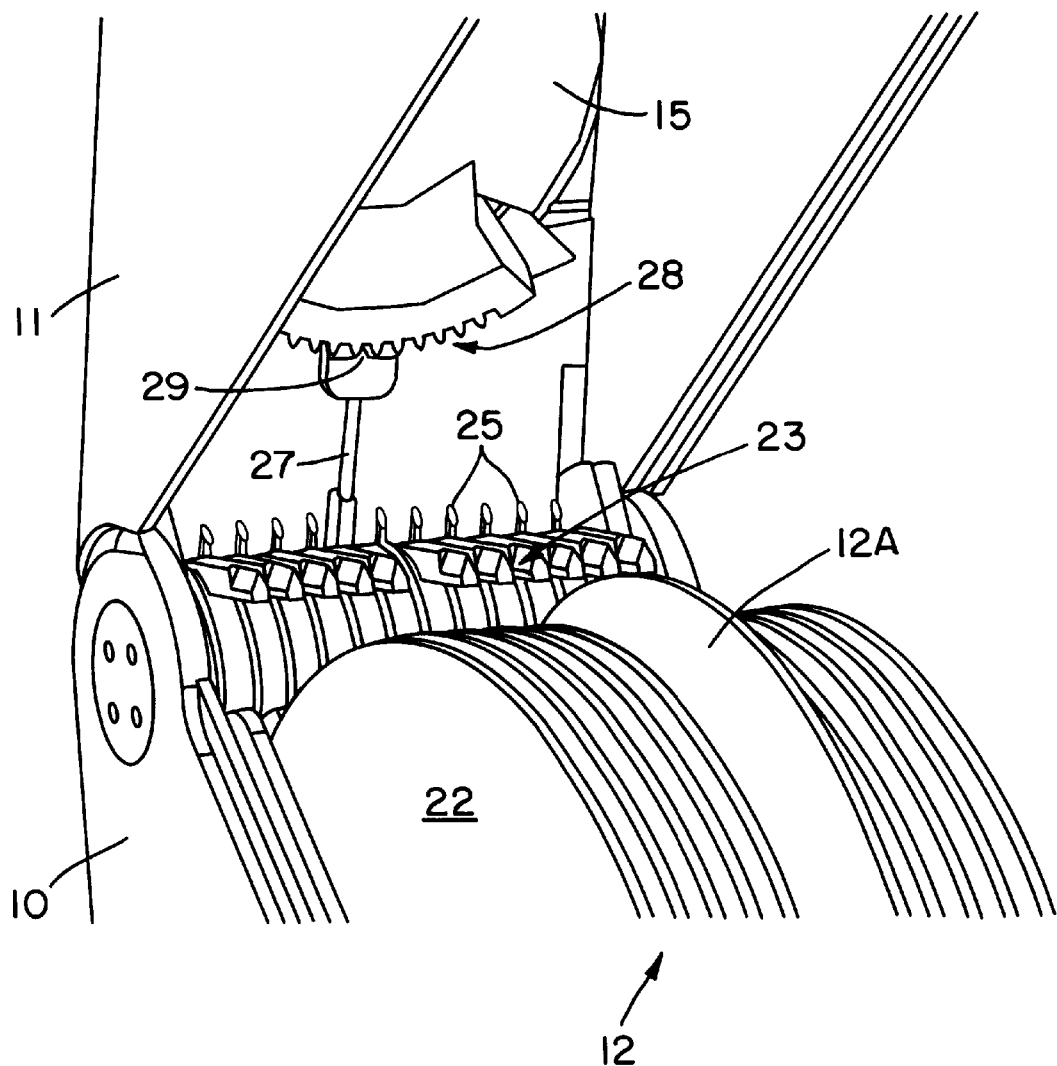
FIG. 3 is an isometric right-hand side view of part of the container with an open lid.

In use, the lid 11 is normally closed to fully enclose a stack of discs inside the container. The user then checks the index 19 to identify which disc he wants to remove. The knob 15 is turned so that a lead line 17 connects a chosen number on the markings 16 to the arrow 18. This moves the probe 27 to opposite a "selected" lifter of the disc to be removed. The latch 20 is released and the lid 11 is opened by the spring 26. As a result, the probe 27 moves up with the lid 11 and mechanically pushes against the selected lifter to raise up the chosen disc 12A, as shown in FIGS. 2 and 3. In the raised position, the disc 12A is easily removable from the stack.

Figure 4:
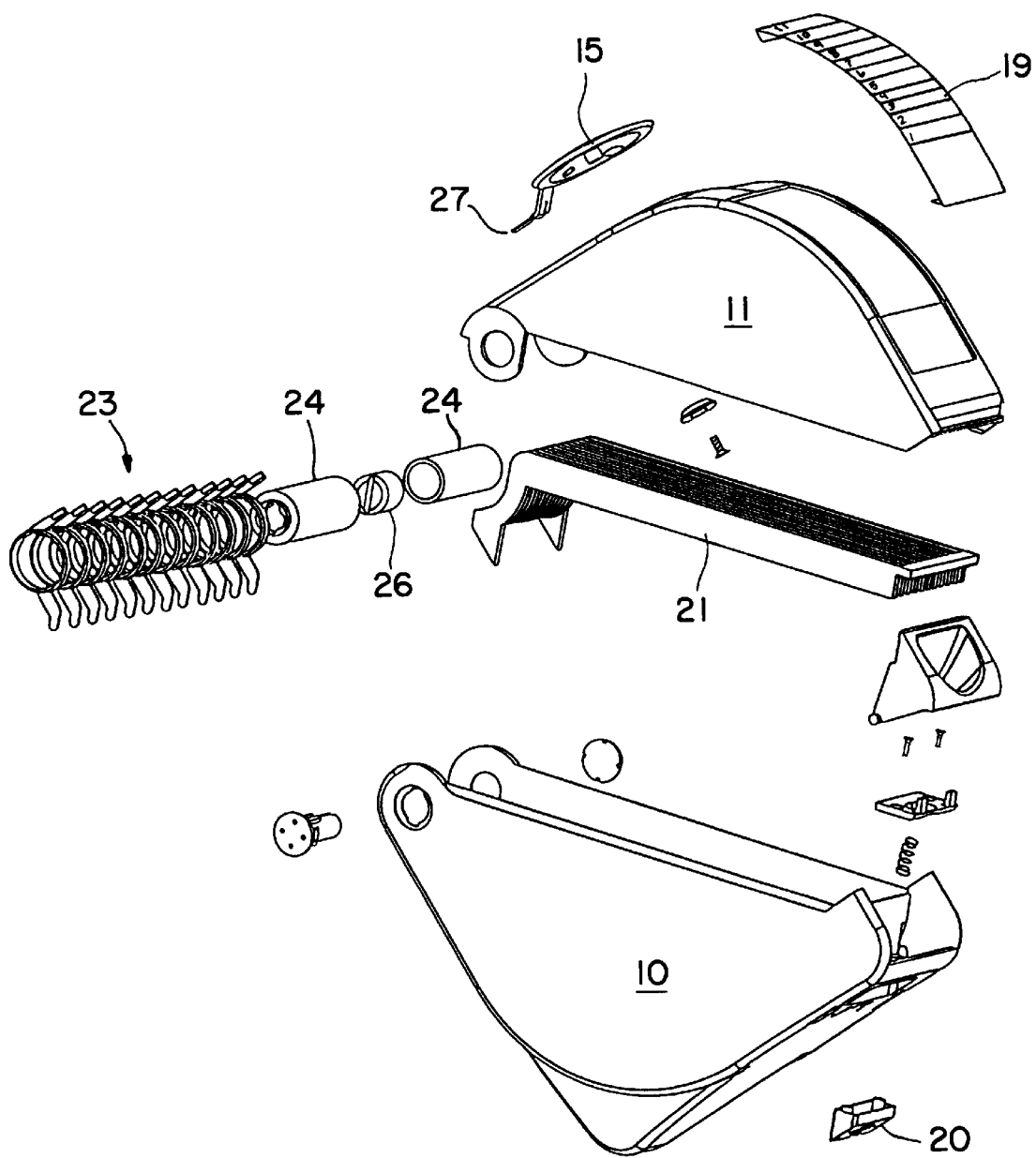
FIG. 4 is an exploded view of the container.

In FIG. 4, the various components referred to above are shown in more detail.

I claim:

1. A disc storage container comprising a base for supporting a plurality of partially exposed discs in a side by side stack, a separator that fits between the discs below exposed regions of the disc to slidably hold the discs parallel and apart from one another, a lid hinged to the base about an axis at one upper edge of the base and arranged to close over the exposed regions of the discs for storage and transportation of the discs, an array of rotatably mounted separate disc lifters, one for each disc arranged to partially lift a respective disc out of the base, and a manually operable lifter selector externally mounted to the lid having a probe inside the lid to engage a selected lifter to urge against a selected lifter for lifting up one of the discs as the lid is opened.

2. A disc storage container according to claim 1, in which the array of disc lifters is mounted on the said axis.

3. A disc storage container according to claim 1, in which the lifter selector is rotatably mounted on the lid and markings are provided to correspond to each disc position in the stack to facilitate selection of each corresponding to rotational positions of the selector.

4. A disc storage container according to claim 3, including a mechanical selector stop for each marking.

5. A disc storage container according to claim 1, in which the container is generally circular in cross section to surround and enclose the stack of discs, in which the base has a horizontal flat bottom and a plane of separation between the base and the lid is at about 45° to the horizontal and extends generally across a diameter of the circular cross section.

6. A disc storage container according to claim 5, including a manually operable latch mounted adjacent a lower edge of the base to engage a remote end of the lid to hold the lid closed.

7. A disc storage container according to claim 5, including a c oil spring mounted about the s aid axis arranged to bias the lid open.

* * * * *